US012647057B2

(12) United States Patent
Wang

(10) Patent No.: US 12,647,057 B2
(45) Date of Patent: Jun. 2, 2026

(54) ELECTRIC VEHICLE MOTOR ROTATIONAL SPEED VALUE GENERATING DEVICE

(71) Applicant: CLEAN POWER PLUS CO., LTD., Taoyuan (TW)

(72) Inventor: Te Ju Wang, Taoyuan (TW)

(73) Assignee: CLEAN POWER PLUS CO., LTD., Taoyuan (TW)

( * ) Notice: Subject to any disclaimer, the term of this patent is extended or adjusted under 35 U.S.C. 154(b) by 257 days.

(21) Appl. No.: 18/632,693

(22) Filed: Apr. 11, 2024

(65) Prior Publication Data

US 2024/0348184 A1     Oct. 17, 2024

(30) Foreign Application Priority Data

Apr. 13, 2023    (TW) ................................. 112113935

(51) Int. Cl.
*H02P 21/18*        (2016.01)
*G06F 7/62*         (2006.01)
*G06F 7/68*         (2006.01)

(52) U.S. Cl.
CPC ................ *H02P 21/18* (2016.02); *G06F 7/62* (2013.01); *G06F 7/68* (2013.01)

(58) Field of Classification Search
CPC ... G06F 7/68; G06F 7/62; H02P 21/18; H02P 23/0027; H02P 23/20; H02P 5/46; H02P 8/40; G03G 15/00; G03G 15/6529; G03G 15/80

See application file for complete search history.

(56) References Cited

U.S. PATENT DOCUMENTS 4,271,382 A * 6/1981 Maeda .................. H02P 23/186
388/922

* cited by examiner

*Primary Examiner* — Said Bouziane
(74) *Attorney, Agent, or Firm* — Che-Yang Chen; Law Office of Michael Chen

(57) ABSTRACT

An electric vehicle motor rotational speed value generating device comprises: a first counter counting an input frequency according to a system frequency and outputs a first bit numerical value; a second counter receiving the first bit numerical value, the second counter counts the first bit numerical value with an exponent n in a $2^n$ exponential function that approximates a maximum rotational speed command value and outputs a second bit numerical value; a frequency divider receiving the second bit numerical value, and the frequency divider divides the second bit numerical value from the system frequency and outputs a counting frequency; and a third counter receiving the counting frequency, and the third counter is electrically connected to a maximum frequency generator and receives a maximum frequency generated by the maximum frequency generator, and the third counter counts the maximum frequency from the counting frequency and outputs a feedback rotational speed value.

7 Claims, 5 Drawing Sheets

ELECTRIC VEHICLE MOTOR ROTATIONAL SPEED VALUE GENERATING DEVICE

BACKGROUND OF THE INVENTION

Field of Invention

The invention relates to a rotational speed value generating device, and more particularly to a rotational speed value generating device for an electric vehicle motor capable of performing fast calculations for real-time transmission and feedback and reducing manufacturing costs.

Related Art

In recent years, environmental awareness has risen. As the world pursues energy conservation and carbon reduction, all walks of life hope to reduce their dependence on petroleum energy. Therefore, electric transportation is a green industry that major car manufacturers are competing to develop, and the governments also actively promote the green energy industry of electric transportation and provide preferential subsidies that allow various car manufacturers to devote themselves to development, thereby enhancing public's confidence in and adoption of electric transportation.

When transportation uses electricity as the power source, one of the differences compared to using gasoline as the power source is that the motor power needs to be managed by the electronic system so that the motor can be controlled to operate in a desired mode, thereby providing the vehicle with corresponding power. If the controller cannot accurately obtain the current dynamic status of the vehicle, it will not be able to provide correct control of the motor, which may easily lead to failure of the power control function, resulting in uncontrollable traveling speed, delayed speed response, or inability of the vehicle to operate. Therefore, the motor controller is generally used to perform feedback control on the motor so that the car can operate normally.

Common motor controllers currently available on the market usually complete the calculation of feedback signals through central processing chips and computing hardware (such as multipliers, dividers, etc.). The advantage is that the design is simple, but calculation through such design can only be implemented by the central processing chip through a compiler using a pre-designed algorithm library. The disadvantage is that the execution time is long. When applied to electric vehicles that need to reflect the rotational speed in real time, there is room for improvement. In addition, if fast calculation is required, high-end central processing chips are usually used, which increases production costs.

Therefore, how to improve the drawbacks and tackle the problems mentioned above is the technical difficulty that the inventor of the invention wants to solve.

SUMMARY OF THE INVENTION

Therefore, in order to effectively solve the above-mentioned problems, a main object of the invention is to provide an electric vehicle motor rotational speed value generating device capable of performing fast calculations for real-time transmission and feedback and reducing manufacturing costs.

In order to achieve the above object, the invention provides an electric vehicle motor rotational speed value generating device comprising: a first counter, the first counter receives a system frequency and an input frequency, and the first counter counts the input frequency according to the system frequency and outputs a first bit numerical value; a second counter, the second counter is electrically connected to the first counter and receives the first bit numerical value, and the second counter counts the first bit numerical value with an exponent n in a $2^n$ exponential function that approximates a maximum rotational speed command value and outputs a second bit numerical value; a frequency divider, the frequency divider is electrically connected to the second counter and receives the second bit numerical value, and the frequency divider divides the second bit numerical value from the system frequency and outputs a counting frequency; and a third counter, the third counter is electrically connected to the frequency divider and receives the counting frequency, the third counter is electrically connected to a maximum frequency generator and receives a maximum frequency generated by the maximum frequency generator, and the third counter counts the maximum frequency from the counting frequency and outputs a feedback rotational speed value.

According to one embodiment of the electric vehicle motor rotational speed value generating device of the invention, wherein the first counter receives a system frequency of an electric vehicle control system and an input frequency generated by a motor device.

According to one embodiment of the electric vehicle motor rotational speed value generating device of the invention, wherein the third counter is electrically connected to a motor controller, and the motor controller receives the feedback rotational speed value and a rotational speed command value generated by the electric vehicle control system.

According to one embodiment of the electric vehicle motor rotational speed value generating device of the invention, wherein the motor controller compares the rotational speed command value with the feedback rotational speed value and generates a motor output numerical value to control the motor device.

According to one embodiment of the electric vehicle motor rotational speed value generating device of the invention, wherein the third counter is further electrically connected to a limiter.

According to one embodiment of the electric vehicle motor rotational speed value generating device of the invention, wherein the maximum frequency generated by the maximum frequency generator is equivalent to a maximum input frequency generated by the motor device.

According to one embodiment of the electric vehicle motor rotational speed value generating device of the invention, wherein the frequency divider further comprises a counting unit, the counting unit counts a system frequency period of the system frequency in a binary manner, the frequency divider generates a counting frequency period from the system frequency period, and the frequency divider converts the counting frequency period into the counting frequency.

DETAILED DESCRIPTION OF THE INVENTION

The above objects of the invention, as well as its structural and functional features, will be described in accordance with the preferred embodiments of the accompanying drawings.

In the following, for the formation and technical content related to an electric vehicle motor rotational speed value generating device of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: "above", "below", "left", "right", "front", "rear", etc., are only directions referring in the accompanying drawings. Therefore, the directional terms are used to illustrate rather than limit the invention. In addition, in the following embodiments, the same or similar elements will be labeled with the same or similar numbers.

Figure 1:
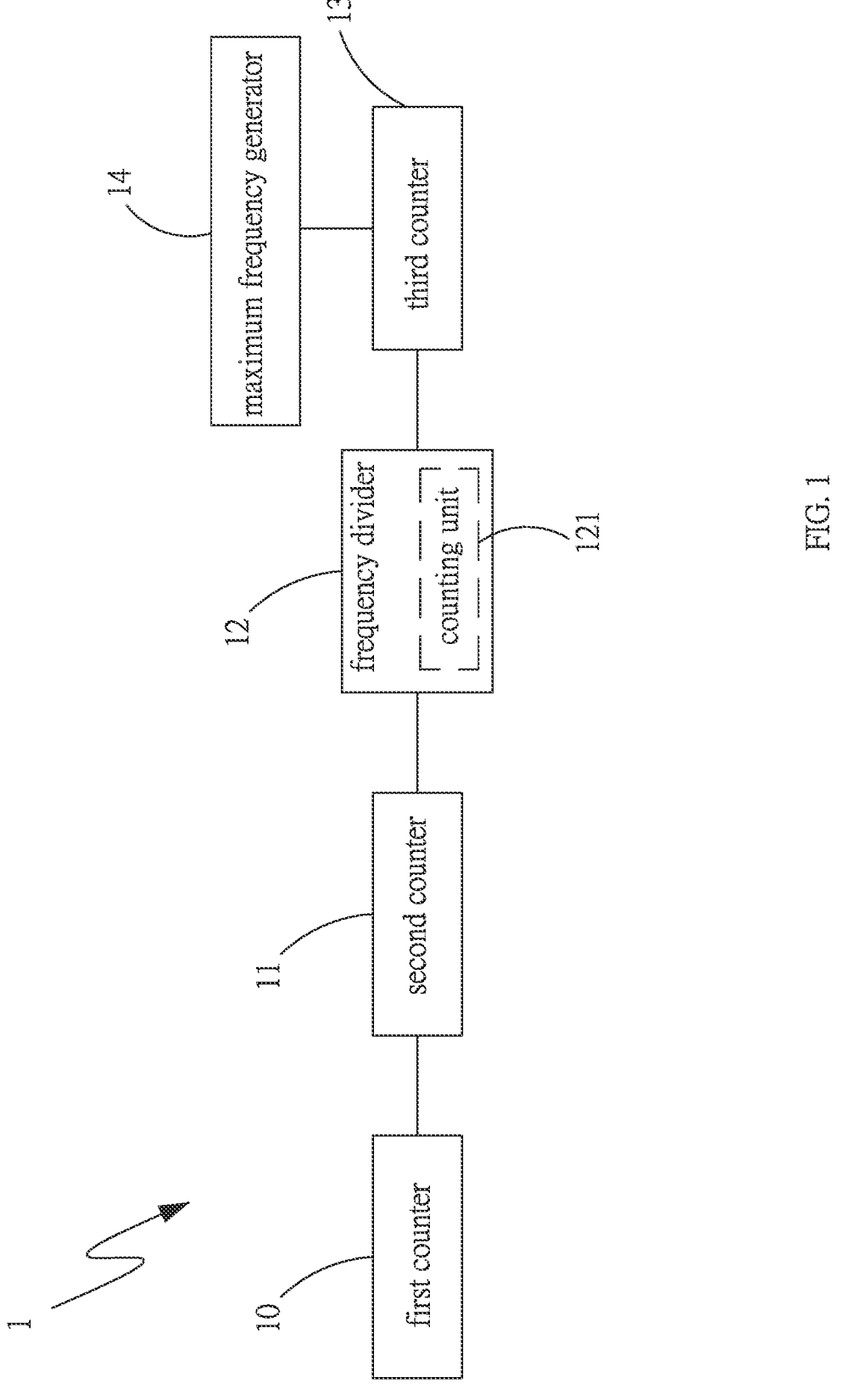
FIG. 1 is a block diagram of an electric vehicle motor rotational speed value generating device of the invention.

Firstly, please refer to FIG. 1 for a block diagram of an electric vehicle motor rotational speed value generating device of the invention. Wherein an electric vehicle motor rotational speed value generating device 1 comprises a first counter 10, a second counter 11, a frequency divider 12, a third counter 13, and a maximum frequency generator 14.

Wherein the first counter 10 is electrically connected to the second counter 11, the second counter 11 is electrically connected to the frequency divider 12, the frequency divider 12 is further electrically connected to the third counter 13, the frequency divider 12 has a counting unit 121, the counting unit 121 is a counter, and the third counter 13 is connected to the maximum frequency generator 14.

Figure 2:
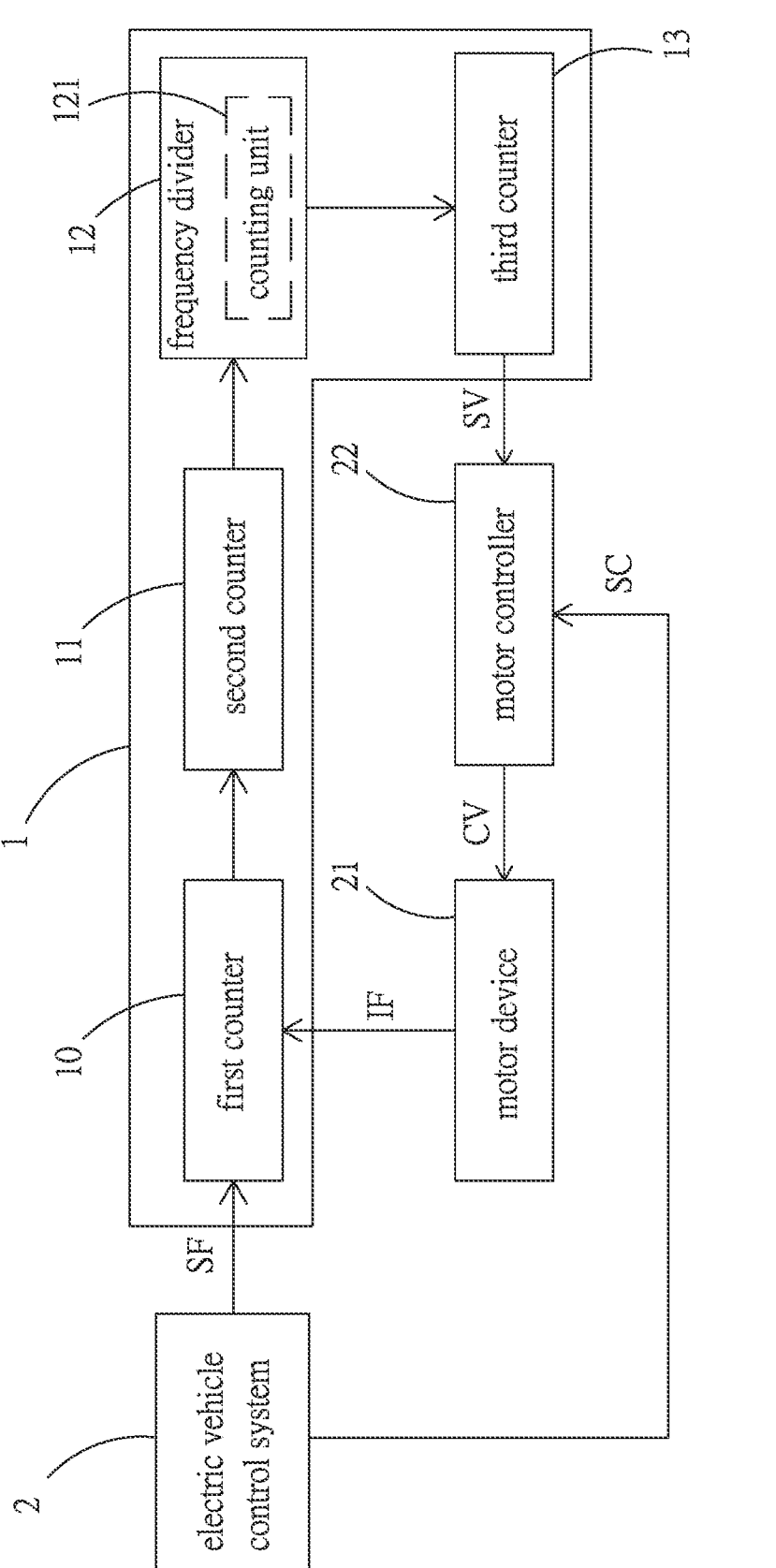
FIG. 2 is a first block diagram of the electric vehicle motor rotational speed value generating device of the invention.

Please refer to FIG. 2 for a first block diagram of the electric vehicle motor rotational speed value generating device of the invention, in which the electric vehicle motor rotational speed value generating device 1 is assembled in an electric vehicle, and the electric vehicle motor rotational speed value generating device 1 is electrically connected to an electric vehicle control system 2, a motor device 21 and a motor controller 22 of the electric vehicle. The electric vehicle control system 2 and the motor device 21 are simultaneously electrically connected to the motor controller 22. Wherein the electric vehicle control system 2 generates a system frequency SF and a rotational speed command value SC, and the motor device 21 generates an input frequency IF. The electric vehicle motor rotational speed value generating device 1 receives the system frequency SF and the input frequency IF, and the motor controller 22 receives the rotational speed command value SC. The invention causes the electric vehicle motor rotational speed value generating device 1 to generate a feedback rotational speed value SV using the system frequency SF and the input frequency IF, so that the motor controller 22 compares the rotational speed command value SC with the feedback rotational speed value SV and then generates a motor output numerical value CV to perform corresponding feedback control on the motor device 21.

The electric vehicle motor rotational speed value generating device 1 is designed with logic circuits. The electric vehicle motor rotational speed value generating device 1 can be a field programmable gate array (FPGA), a logic integrated circuit (IC) or an integrated circuit combined with logic circuits. By using the logic circuits to replace a central processing chip and computing hardware to perform calculations, a feedback signal (i.e., the above-mentioned feedback rotational speed value SV) can be obtained to achieve efficacies of fast calculation and reducing production costs.

In addition, a design result of the electric vehicle motor rotational speed value generating device 1 conforms to a relation: the input frequency IF×the feedback rotational speed value SV (feedback signal)=counting frequency CF. In this way, during application, the corresponding feedback rotational speed values SV (feedback signals) can be known at the different input frequencies IF.

Figure 3:
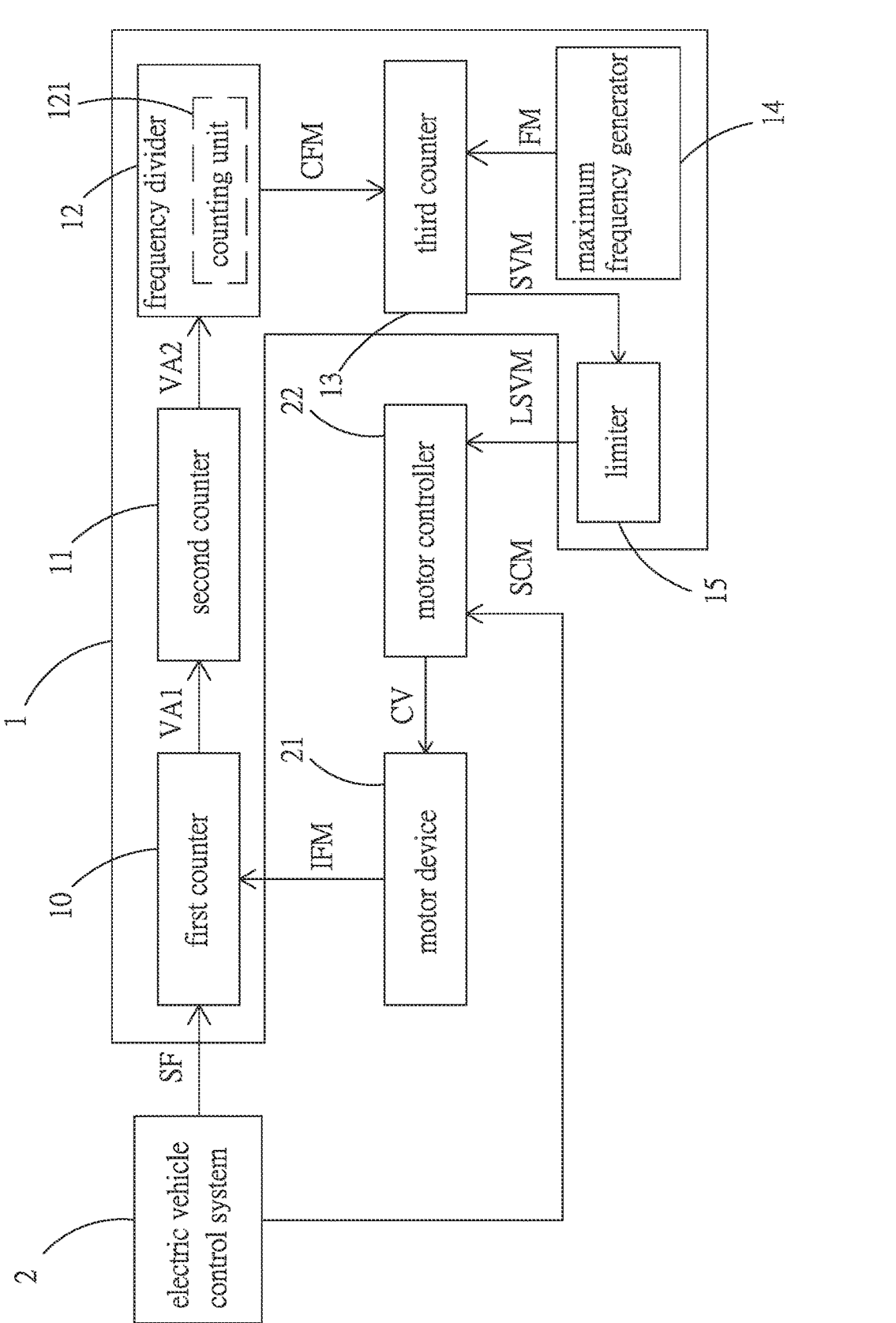
FIG. 3 is a second block diagram of the electric vehicle motor rotational speed value generating device of the invention.

In addition, please refer to FIG. 3 for a second block diagram of the electric vehicle motor rotational speed value generating device of the invention. The following embodiment is illustrated. If, by default, it is required to obtain the electric vehicle motor rotational speed value generating device 1 applied to the system frequency SF of 16 MHz, a maximum input frequency IFM of the motor device 21 of 400 Hz, and a maximum rotational speed command value SCM of 1023 corresponding to the maximum input frequency IFM, corresponding circuit design and operation of the electric vehicle motor rotational speed value generating device 1 are described hereinafter.

The electric vehicle motor rotational speed value generating device 1 is designed according to a relation of the maximum input frequency IFM×maximum feedback rotational speed value SVM (feedback signal)=maximum counting frequency CFM. In this embodiment, the known numerical values are the system frequency SF 16 MHz, the maximum input frequency IFM 400 Hz and the maximum rotational speed command value SCM 1023. Therefore, the above relation can be broken down into the maximum input frequency IFM×the maximum feedback rotational speed value SVM (feedback signal)=the maximum counting frequency CFM=the system frequency SF/unknown number X, and hope that the final maximum feedback rotational speed value SVM can be consistent or approximate to the maximum rotational speed command value SCM. Therefore, the relation can be further adjusted to the maximum input frequency IFM×the maximum rotational speed command value SCM=the system frequency SF/unknown number X. In this embodiment, the relation is: 400 Hz×1023=16 MHz/unknown number X. Finally, a logic circuit can be designed based on the relation to obtain the unknown number X. After the unknown number X is obtained, the maximum counting frequency CFM (16 MHz/the unknown number X) can be calculated, and then the maximum feedback rotational speed value SVM can be obtained.

In this embodiment, the first counter 10 receives the system frequency SF and the maximum input frequency IFM, and the first counter 10 counts the maximum input frequency IFM according to the system frequency SF and outputs a first bit numerical value VA1, the first bit numerical value VA1 is 16000000/400=40000 (decimal, does not actually appear in a logic circuit, but is only shown for the convenience of understanding)=1001,1100,0100,0000 (binary, an actual numerical value generated in the logic circuit). The binary first bit numerical value VA1 is 1001, 1100,0100,0000 and is transmitted to the second counter 11, and the second counter 11 counts the first bit numerical value VA1 with an exponent n in a $2^n$ exponential function that approximates the maximum rotational speed command value SCM and outputs a second bit numerical value VA2 (n is used as a value of the first bit numerical value VA1). In this embodiment, the maximum rotational speed command value SCM is 1023, which is approximately $1024=2^{10}$, and n is 10. Therefore, the second counter 11 deletes the last 10 digits of the first bit numerical value VA1, and takes the first 6 digits of the first bit numerical value VA1 (maximum is 6 bits, MSB6), so the second bit numerical value VA2 is 10,0111 (binary)=39 (decimal, does not actually appear in a logic circuit, but is only shown for the convenience of understanding), and the second bit numerical value VA2 is the unknown number X. In addition, when the second counter 11 in the invention counts (takes a value), it is not limited to $2^{10}$, that is, n=10. n depends on the default maximum rotational speed command value SCM. If the default maximum rotational speed command value SCM is set to 2047, then 2047 is approximately $2^{11}$, and n is 11 at this time. Then the second counter 11 takes a value based on n=11, that is, circuits of the second counter 11 is designed based on the n value.

Figure 4:
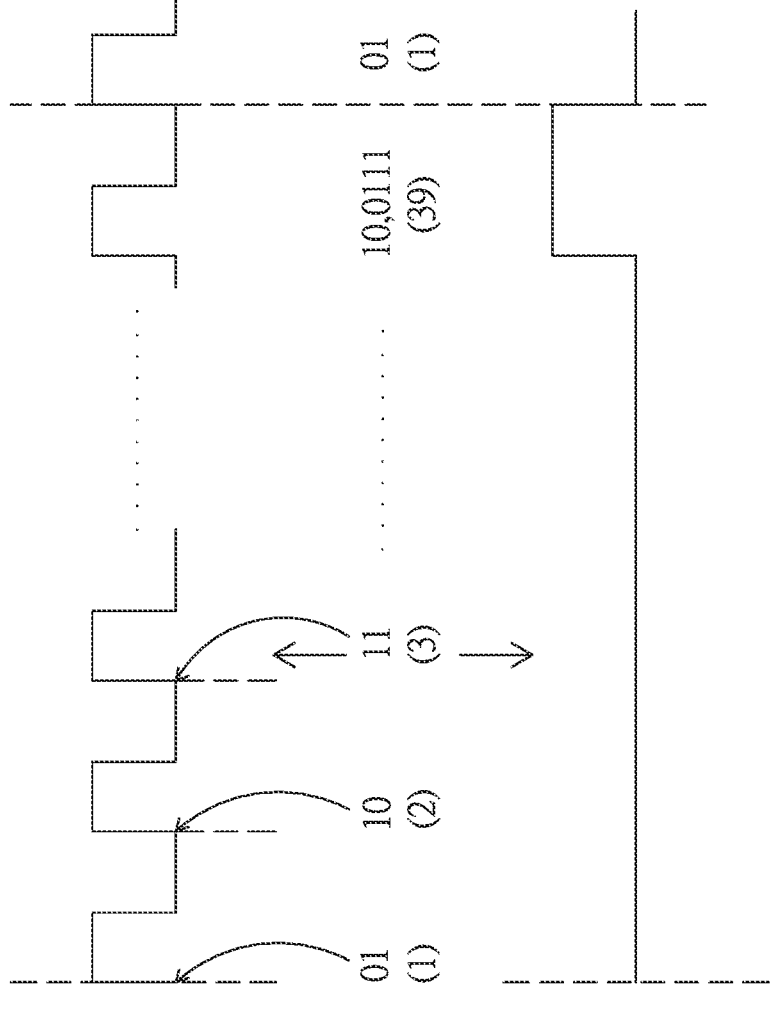
FIG. 4 is a schematic diagram of frequency period conversion of the electric vehicle motor rotational speed value generating device of the invention.

The frequency divider 12 receives the second bit numerical value VA2, divides the second bit numerical value VA2 using the system frequency SF and outputs a counting frequency CF, the counting frequency CF is 16000000/39≈410256 Hz, wherein the frequency division step is described as follows. The frequency divider 12 has the counting unit 121. The counting unit 121 counts a number of times generated by a system frequency period SFT of the system frequency SF in a decimal manner. When counting to the second bit numerical value VA2 of 10,0111, the frequency divider 12 generates a counting frequency period CFT from the system frequency period SFT. The counting frequency period CFT is a sum of the counted system frequency periods SFT, and then the frequency divider 12 converts the counting frequency period CFT into the counting frequency CF and outputs the counting frequency CF. As shown in FIG. 4, when the counting unit 121 counts to the second bit numerical value VA2 of 10,0111, because 10,0111 is 39 binary bits, the counting unit 121 has counted 39 times in total. At this time, the frequency divider 12 generates the counting frequency period CFT. Therefore, the counting frequency period CFT is 39 times the system frequency period SFT, which is 39/16000000, and the counting frequency CF is its reciprocal, which is 16000000/39≈410256 Hz. At this time, the counting frequency CF is the maximum counting frequency CFM. Therefore, according to the combined design of the first counter 10, the second counter 11 and the frequency divider 12, after inputting the system frequency SF and the maximum input frequency IFM, the maximum counting frequency CFM can be obtained.

The third counter 13 receives the maximum counting frequency CFM and a maximum frequency FM generated by the maximum frequency generator 14. A numerical value of the maximum frequency FM is the same as a numerical value of the maximum input frequency IFM. In this embodiment, the maximum frequency FM is 400 Hz, and the maximum counting frequency CFM is used to count the maximum frequency FM and the maximum feedback rotational speed value SVM is outputted. In this embodiment, the maximum feedback rotational speed value SVM is 410256/400≈1025. In this way, the maximum feedback rotational speed value SVM can be obtained according to the third counter 13. In this embodiment, the maximum feedback rotational speed value SVM is 1025 and there is a slight error with the maximum rotational speed command value SCM being 1023. However, an error percentage is (1025−1023)/1023=0.0019=0.19%, the error is extremely small and can be ignored in applications of electric vehicle feedback signals. Accordingly, the electric vehicle motor rotational speed value generating device 1 uses a logic circuit design of the first counter 10, the second counter 11, the frequency divider 12, the third counter 13 and the maximum frequency generator 14 to replace the conventional central processing chip equipped with multipliers and dividers, which is capable of achieving efficacies of fast calculations for real-time transmission and feedback and reducing manufacturing costs.

In addition, the third counter 13 is electrically connected to a limiter 15, the limiter 15 is capable of limiting the maximum feedback rotational speed value SVM outputted to the motor controller 22, mainly to forcibly limit the maximum feedback rotational speed value SVM being the same as the maximum rotational speed command value SCM, so that the motor controller 22 can operate normally. When the maximum feedback rotational speed value SVM exceeds the maximum rotational speed command value SCM, the limiter 15 generates a feedback limit value LSVM and outputs the feedback limit value LSVM to the motor controller 22. In this embodiment, the maximum feedback rotational speed value SVM is 1025, which exceeds the maximum rotational speed command value SCM being 1023, the limiter 15 generates the feedback limit value LSVM, the feedback limit value LSVM being 1023 is then outputted.

Figure 5:
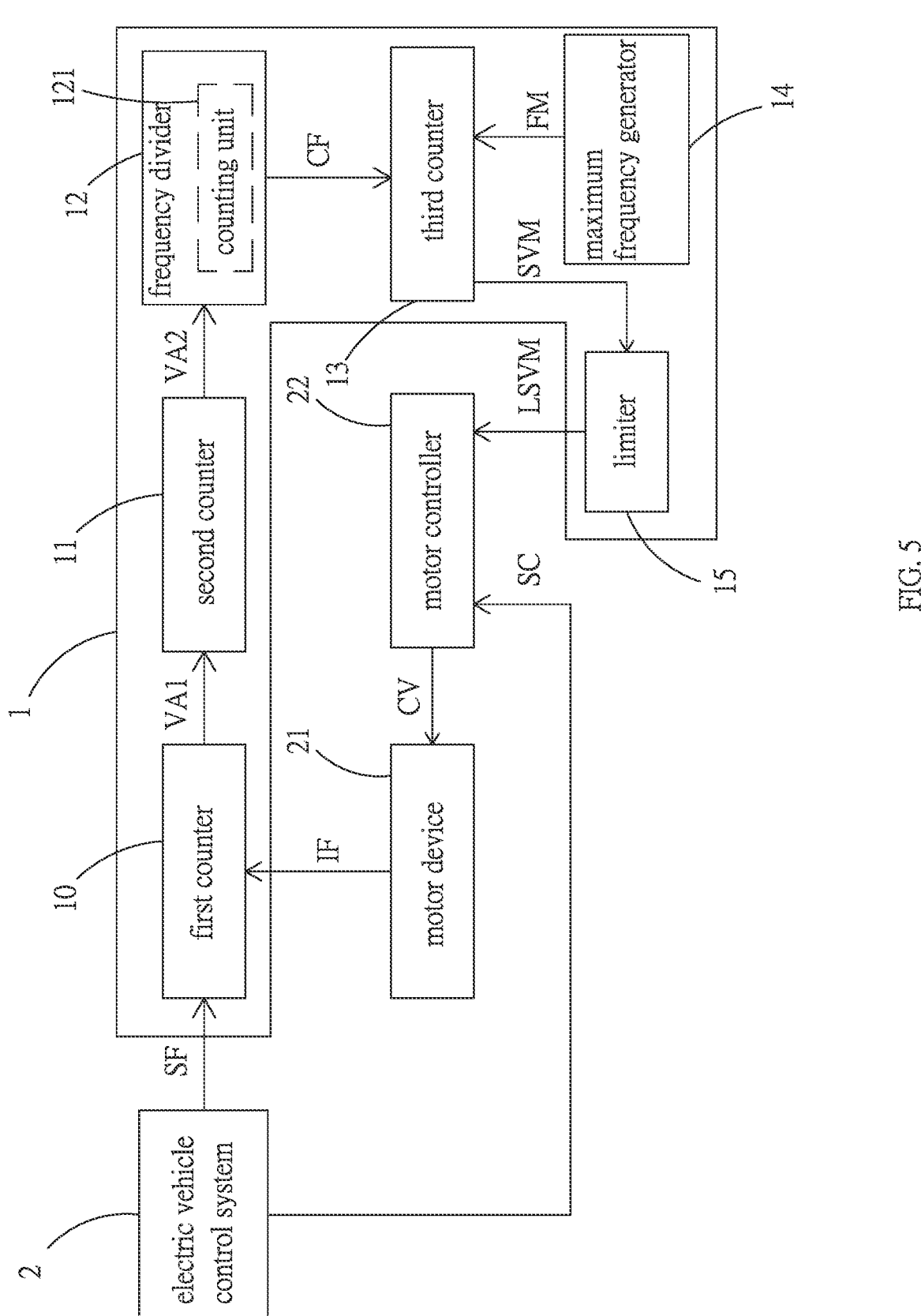
FIG. 5 is a third block diagram of the electric vehicle motor rotational speed value generating device of the invention.

Please refer to FIG. 5 for a third block diagram of the electric vehicle motor rotational speed value generating device of the invention. With the electric vehicle motor rotational speed value generating device 1 designed according to the above embodiments, the corresponding feedback rotational speed values SV (feedback signals) can be known at the different input frequencies IF. For example, when the rotational speed command value SC decreases, a motor rotational speed decreases and the input frequency IF thereof also decreases to 300 Hz. At this time, the first counter 10 counts the input frequency IF being 300 according to the system frequency SF and outputs the first bit numerical value VA1, the first bit numerical value VA1 is 16000000/300=53333 (decimal)=1101,0000,0101,0101 (binary), and the binary first bit numerical value VA1 being 1101,0000, 0101,0101 is transmitted to the second counter 11. The second counter 11 counts the first bit numerical value VA1 with the exponent n in the $2^n$ exponential function that approximates the maximum rotational speed command value SCM, wherein the exponent n in the $2^n$ exponential function that approximates the maximum rotational speed command value SCM is $2^{10}$, n is 10, and the second counter 11 counts the first bit numerical value VA1 with the exponent n in the $2^n$ exponential function that approximates the maximum rotational speed command value SCM and outputs the second bit numerical value VA2. Therefore, the second counter 11 deletes the last 10 digits of the first bit numerical value VA1, and takes the first 6 digits of the first bit numerical value VA1, so the second bit numerical value VA2 is 1101,00 (binary)=52 (decimal). The frequency divider 12 receives the second bit numerical value VA2, divides the second bit numerical value VA2 from the system frequency SF and outputs the counting frequency CF, and the counting frequency CF is 16000000/52≈307,692 Hz. The third counter 13 receives the counting frequency CF and the maximum frequency FM generated by the maximum frequency generator 14, and counts the maximum frequency FM with the counting frequency CF and outputs the feedback rotational speed value SV, so the feedback rotational speed value SV is 307692/400≈769. Therefore, in this embodiment, when the input frequency IF becomes 300 Hz, the electric vehicle motor rotational speed value generating device 1 outputs the feedback rotational speed value SV (769) to the motor controller 22. Therefore, when a motor rotational speed changes (when the input frequency IF changes), the electric vehicle motor rotational speed value generating device 1 is capable of generating a corresponding feedback signal to facilitate the motor controller 22 to compare and judge and perform feedback control on the motor so that the car can run normally.

The invention has been described in detail above, but the above description is only a preferred embodiment of the invention, and should not limit a scope implemented by the invention, that is, all equivalent changes and modifications made according to the applied scope of the invention should still fall within the scope covered by the appended claims of the invention.

What is claimed is:

1. An electric vehicle motor rotational speed value generating device comprising:
   a first counter, the first counter receiving a system frequency and an input frequency, and the first counter counting the input frequency according to the system frequency and outputting a first bit numerical value;
   a second counter, the second counter being electrically connected to the first counter and receiving the first bit numerical value, and the second counter counting the first bit numerical value with an exponent n in a $2^n$ exponential function that approximating a maximum rotational speed command value and outputting a second bit numerical value;
   a frequency divider, the frequency divider being electrically connected to the second counter and receiving the second bit numerical value, and the frequency divider dividing the second bit numerical value from the system frequency and outputting a counting frequency; and a third counter, the third counter being electrically connected to the frequency divider and receiving the counting frequency, the third counter being electrically connected to a maximum frequency generator and receiving a maximum frequency generated by the maximum frequency generator, and the third counter counting the maximum frequency from the counting frequency and outputting a feedback rotational speed value.

2. The electric vehicle motor rotational speed value generating device as claimed in claim 1, wherein the first counter receives a system frequency of an electric vehicle control system and an input frequency generated by a motor device.

3. The electric vehicle motor rotational speed value generating device as claimed in claim 2, wherein the third counter is electrically connected to a motor controller, and the motor controller receives the feedback rotational speed value and a rotational speed command value generated by the electric vehicle control system.

4. The electric vehicle motor rotational speed value generating device as claimed in claim 3, wherein the motor controller compares the rotational speed command value with the feedback rotational speed value and generates a motor output numerical value to control the motor device.

5. The electric vehicle motor rotational speed value generating device as claimed in claim 1, wherein the third counter is further electrically connected to a limiter.

6. The electric vehicle motor rotational speed value generating device as claimed in claim 2, wherein the maximum frequency generated by the maximum frequency generator is equivalent to a maximum input frequency generated by the motor device.

7. The electric vehicle motor rotational speed value generating device as claimed in claim 1, wherein the frequency divider further comprises a counting unit, the counting unit counts a system frequency period of the system frequency in a binary manner, the frequency divider generates a counting frequency period from the system frequency period, and the frequency divider converts the counting frequency period into the counting frequency.

* * * * *